(12) United States Patent
Verde (10) Patent No.: US 6,491,813 B2
(45) Date of Patent: Dec. 10, 2002

(54) EQUIPMENT FOR DESALINATION OF WATER BY REVERSE OSMOSIS WITH ENERGY RECOVERY

(75) Inventor: Riccardo Verde, Naples (IT)

(73) Assignee: Schenker Italia S.R.L., Naples (IT)

( * ) Notice: Subject to any disclaimer, the term of this patent is extended or adjusted under 35 U.S.C. 154(b) by 0 days.

(21) Appl. No.: 09/773,435

(22) Filed: Feb. 1, 2001

(65) Prior Publication Data

US 2001/0017278 A1 Aug. 30, 2001

(30) Foreign Application Priority Data

Feb. 2, 2000 (IT) .................................. MI2000A000155

(51) Int. Cl.⁷ .......................... B01D 61/10; B01D 61/06; F04B 23/04
(52) U.S. Cl. ............. 210/137; 210/321.65; 210/321.66; 210/416.1; 417/225; 417/313; 417/393; 417/404
(58) Field of Search .................... 210/137, 321.66, 210/416.1, 416.3, 652, 175, 186, 184, 321.65; 417/225, 313, 377, 393, 404

(56) References Cited

U.S. PATENT DOCUMENTS

| | | | | | |
|---|---|---|---|---|---|
| 3,825,122 | A | * | 7/1974 | Taylor | 417/404 |
| 4,367,140 | A | * | 1/1983 | Wilson | 210/137 |
| 4,592,768 | A | * | 6/1986 | Cutler et al. | 210/652 |
| 5,462,414 | A | * | 10/1995 | Permar | 417/404 |
| 5,628,198 | A | * | 5/1997 | Permar | |
| 6,017,200 | A | * | 1/2000 | Childs et al. | 417/404 |
| 6,203,696 | B1 | * | 3/2001 | Pearson | 210/321.66 |

* cited by examiner

Primary Examiner—Joseph W. Drodge
(74) Attorney, Agent, or Firm—Herbert Dubno (57) ABSTRACT

The equipment for desalination of water by reverse osmosis comprises: a pump 1 for drawing the water to be salinated, a high pressure pump 25, a cylindrical block 8 housing two pistons 3, 4 connected to one another by a shaft 5 and disposed, freely slidable and liquid-tight, within respective cylinders 6, 7 being part of the same block (8) and separated from one another by a central plate 9, the latter being liquid-tight; the equipment further comprises an exchange valve 14 controlled by the position of said pistons 3, 4, as well as a cylinder or, in general, one or more containers, possibly arranged in series, in parallel or in series/parallel 15, containing one or more reverse osmosis membranes (16).

19 Claims, 10 Drawing Sheets

EQUIPMENT FOR DESALINATION OF WATER BY REVERSE OSMOSIS WITH ENERGY RECOVERY

FIELD OF THE INVENTION

The present invention relates to equipment for desalination of water by reverse osmosis which allows energy recovery through various solutions and related variants.

BACKGROUND OF THE INVENTION

It is known that the filtration of a liquid by reverse osmosis requires the use of high pressures and that the conventional equipment used therefore, producing high pressures by means of a high pressure pump and a throttle valve, has low energy efficiency.

OBJECT OF THE INVENTION

The main object of the present invention is to provide equipment for desalination of water by reverse osmosis whereby an energy saving is achieved.

SUMMARY OF THE INVENTION

In a first solution, the high pressure needed for the reverse osmosis process is achieved through a device able to hydraulically amplify the pressure provided by low pressure pumps.

Therefore, this equipment doesn't need the high pressure pumps of a conventional reverse osmosis system, but can make use of low pressure pumps, suitably connected to a pressure amplifier (described hereinbelow) as well as to the reverse osmosis membranes.

The energy saving is thus achieved through the considerable reduction of the system feeding pressure, which is amplified by a passive amplifying device.

In a second solution, the high pressure needed for the reverse osmosis pressure is achieved through a conventional high pressure pump.

However, the flow rate of this pump is not equal to the total flow rate of the water to be treated, as in the conventional systems, but is only equal to the flow rate of fresh water produced by the system.

This is achieved through a hydraulic device (described hereinbelow) which forms a closed circuit between the inlet and the outlet of the reverse osmosis membrane, allowing a fresh water production equal to the flow rate provided by the high pressure pump.

The energy saving is thus achieved through the considerable reduction of the flow rate of the high pressure pump for feeding the system.

The present invention also involves various switching systems or the cycle reversal valve as well as arrangements for further increasing the working flexibility of the system.

BRIEF DESCRIPTION OF THE DRAWING

These and other features are evident from the following description of a preferred embodiment of the equipment according to the present invention, which is illustrated, by way of a non-limiting example, in the Figures of the accompanying drawing.

In the drawing.

SPECIFIC DESCRIPTION

Figure 1:
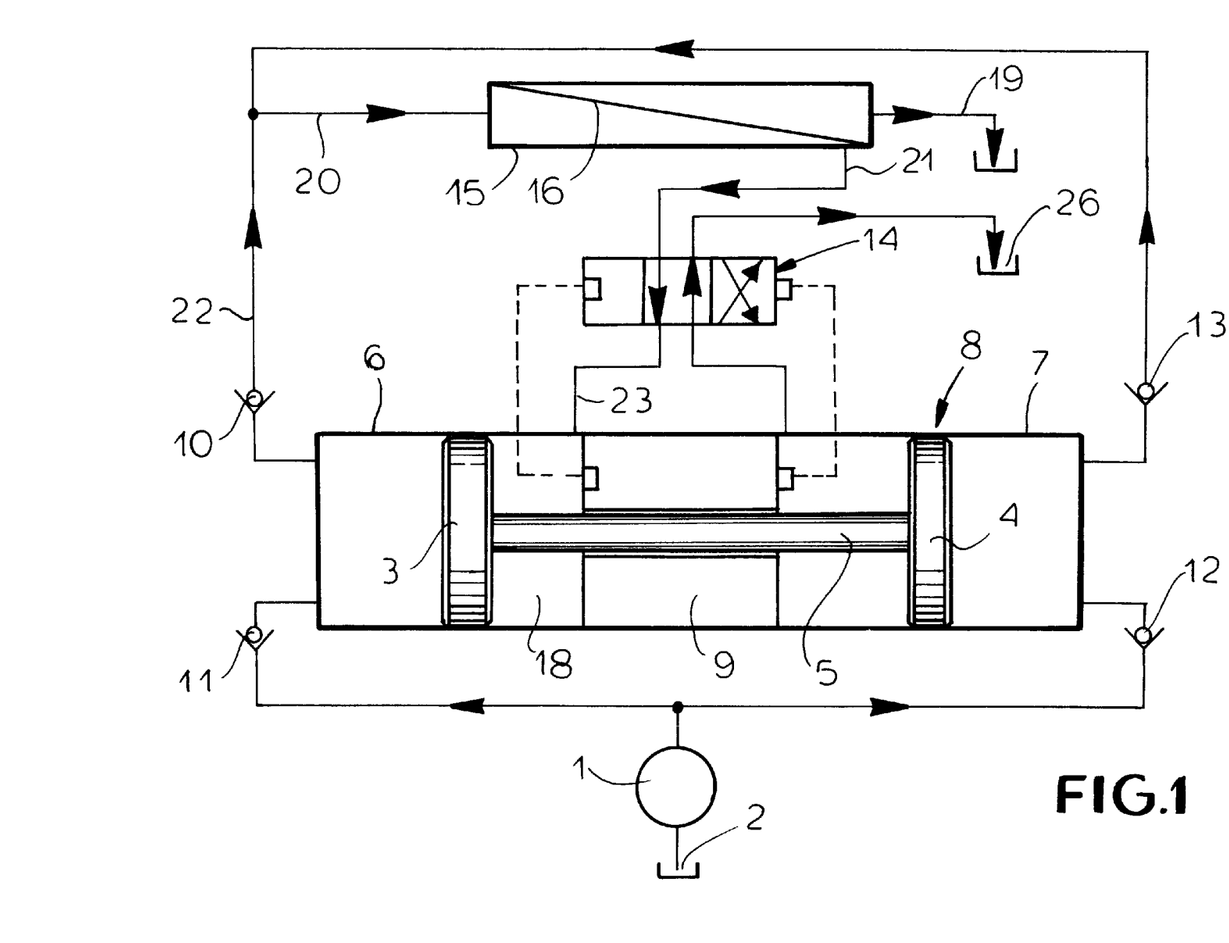
FIG. 1 shows, in an overall schematic view, the equipment of the invention according to the first solution.
Figure 2:
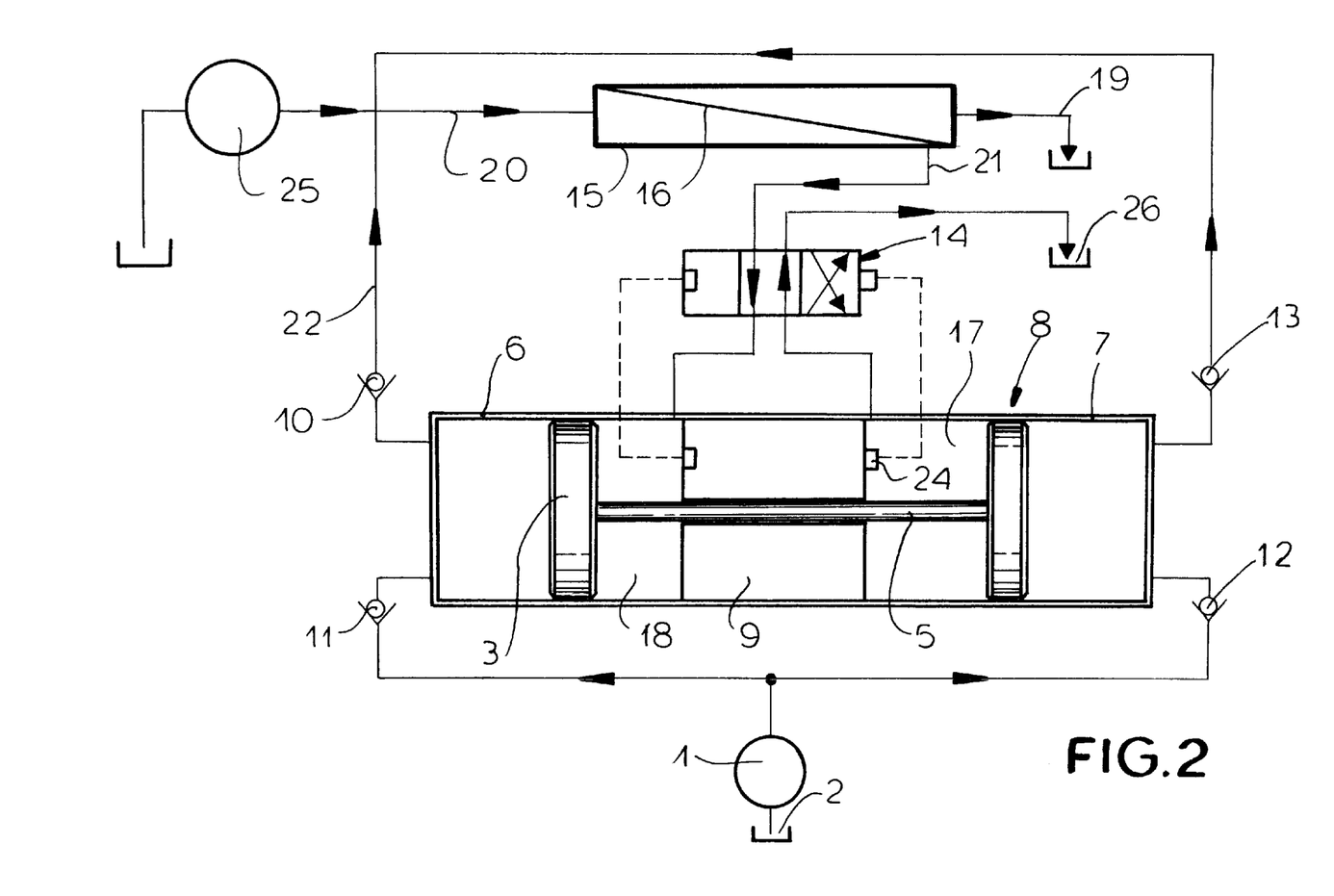
FIG. 2 shows, in an overall schematic view, the equipment of the invention according to the second solution.

The equipment shown in FIG. 1 and the equipment shown in FIG. 2, as well as related variants, are described in relation to the desalination of water, but they may be also used in other applications characterized by the need of taking a fluid to a high pressure level.

The basic elements forming the equipment of FIG. 1 are the following:

a feeding pump 1 which draws the fluid 2 to be desalinated;

a cylinder block 8 housing two pistons 3 and 4, which are integrally connected by a shaft 5 and are freely slidable, while fluid-tight, in two respective cylinders 6 and 7, separated from one another, within said block 8, by a central plate 9, the latter being fluid-tight;

four check valves 10, 11, 12, 13, respectively;

an exchange valved 14, controlled by the position of pistons 3 and 4;

one or more cylinders 15 containing one or more reverse osmosis membranes 16; and hydraulic connection lines between the aforementioned components.

The working principle of the apparatus in FIG. 1 is as follows.

The apparatus has two working conditions, related to the position of valve 14.

In the position shown in FIG. 1 (condition 1), pump 1, through check valve 12, fills cylinder 7, by pushing the pistons 3, 4 toward the left.

The pressure acting on cylinder 7 corresponds to the pump head at its operating point.

The exhaust water in chamber 17 downstream of piston 4 is discharged through valve 14 to the collector 26.

Piston 3, as a result of the force exerted by connecting shaft 5, pushes the liquid, through check valve 10, in cylinder 15 containing membrane 16.

Part of the outflow from this cylinder 15 comes back, through line 21 and valve 14, to chamber 18 of cylinder 6, downstream of piston 3.

Through membrane 16 and then in line 19, a flow of liquid (permeate) is forced which is equal to the flow of line 20 minus the flow of line 21, i.e. corresponding to the water "displaced" by shaft 5 in its travel within cylinder 6. The pressure increase in this cylinder (hence in the whole high pressure closed circuit 20-21-22-23), with respect to the pressure upstream of piston 4, is in turn equal to the Q22/Q19 ratio, i.e. the ratio between the outflow from cylinder 6 and the outflow from membrane 16.

Such a ratio is equal to the geometric ratio between the section of cylinder 6 and the section of shaft 5, i.e. the volumetric ratio of the water outflowing from this cylinder and the water "displaced" by shaft 5 within the same cylinder 6.

When piston 4 ends its travel and abuts onto the central plate 9, it engages a microswitch 24 which switches the position of valve 14.

In this condition, chamber 17 downstream of piston 4 will be connected to the outlet of cylinder 15 containing membrane 16.

Chamber 18 downstream of piston 3 will be then connected to exhaust 26, and, therefore, the cycle is reversed.

As far as the embodiment just described is concerned, the variant illustrated in FIG. 2 is characterized by the following substantial changes:

- the section of shaft 5, connecting pistons 3, 4, is negligible, i.e. is much smaller than the section of cylinders 6, 7;
- on high pressure line 20 a high pressure pump 25 is connected which has a flow rate vs. head curve such that its maximum efficiency operating point corresponds to the ideal working pressure of membrane 16, and to the desired flow rate of fresh water to be produced.

According to this variation, pump 1 has thus simply the function of alternatively filling cylinders 6 and 7 and allowing a suitable sliding of pistons 3, 4 in their reciprocating motion, i.e. it has enough power to overcome the sliding friction of the pistons and shaft 5 at the desired speed, as well as the hydraulic pressure drops.

Likewise the equipment previously described, the one illustrated in FIGS. 2 operates according to two conditions:

CONDITION 1: pistons 3, 4 move to the left. In this working condition, chamber 18, provided with piston 3, is connected to container 15 carrying membrane 16, while chamber 17, provided with piston 4, is connected to exhaust 26.

Hydraulic circuit 6-22-20-15-21-23-18 is therefore a closed circuit, i.e. it has a constant volume, since the volume decrease due to the penetration of shaft 5 in chamber 18 is negligible, the section of this shaft having been assumed to be very small.

Such a circuit is a closed circuit, accordingly the high pressure water, pumped by pump 25, instantaneously increases the pressure of said circuit and the water supplied by high pressure pump 25 is forced to outflow from membrane 16 as fresh water.

CONDITION 2: pistons 3, 4 move to the right, as a result of the switching of valve 14. Chamber 18, provided with piston 3, is then connected to the exhaust, while chamber 17, provided with piston 4, is connected to container 15 carrying membrane 16.

In this working step, cylinder 7 is in a closed circuit with membrane 16, and, as in step 1, the high pressure water, pumped by pump 25, instantaneously increases the pressure of said circuit. The water supplied by high pressure pump 25 is finally forced to outflow from membrane 16 as fresh water.

In both the working steps, the amount of fresh water outflowing from membrane 16, as well as the pressure of the high pressure circuit, will be determined by the equilibrium point reached by the system, as a function of the curve flow rate vs. head of high pressure pump 25, the properties of membrane 16, the temperature and the salinity of the fluid to be treated.

Pump 1 (low pressure pump) has instead just the function to allow the translation of pistons 3, 4 and thus the pumping of saline water in container 15.

The ratio between the flow rate of high pressure pump 25 (Q25) and the flow rate of pump 1 (Q1) corresponds to the so-called recovery of membrane 16, i.e. to the ratio between the liquid passing through the same membrane (Q25), thereby becoming fresh water, and the total flow rate of the liquid arriving to the same membrane 16 (Q1).

For example, assume that, in the respective equilibrium conditions, pump 1 works at a flow rate of 100 l/h and a pressure of 1 bar, and that the pump 25 works at a flow rate of 15 l/h and a pressure of 60 bar, the fresh water production will be equal to 15 l/h, and the recovery of membrane 16 will be equal to 15% (15/100).

The total energy needed for the process is equal to the energy consumed by the two pumps, i.e. it is proportional to the sum of the products of the respective pressures and flow rates.

Therefore, assuming:

P1 working pressure of pump 1 (e.g. 1 bar)

Q1 working flow rate of pump 1 (e.g. 100 l/h)

P25 working pressure of pump 25 (e.g. 60 bar)

Q25 working flow rate of pump 25 (e.g. 15 l/h)

the energy consumed by the system will be equal to:

$$E = k(Q1 \times P1 + Q25 \times P25) = k(100 \times 1 + 15 \times 60) = k(100 + 900),$$

where constant k takes into account the pump efficiency, the hydraulic pressure drops and the conversions between the units.

It is clear that the energy consumed by high pressure pump 25 is greater than the energy consumed by pump 1. Furthermore, most of the energy consumed by pump 1 will be converted to production of fresh water, since the section of shaft 5 being very small, but not null, the water displaced by the shaft in the high pressure cylinder will give an equivalent volume of fresh water, according to the aforementioned principle, thereby making the passive energy consumed by pump 1 nearly null.

Thus, the energy of the system may be assumed to be proportional to the product of the flow rate and the head of pump 25, i.e. the product of the production of fresh water and the working pressure of membrane 16.

For FIG. 2 the energy consumed by the conventional turbine systems not provided with energy recovery (high pressure pump—membrane—throttle valve) should be compared relative to the equipment in FIG. 1 and to the equipment with high pressure pump 25.

In this example, it is assumed a working pressure of membrane 16 equal to 60 bar, a flow rate of saline water to be treated equal to 100 l/h and a fresh water production equal to 15 l/h (i.e. a 15% recovery).

Conventional equipments:

$$\text{energy consumed} = k(100 \times 60) = k \times 6000$$

(the pump flow rate being equal to the total flow rate to be treated and the pump working pressure being equal to the membrane working pressure).

Equipment of FIG. 1 (assuming a ratio between the shaft section and the cylinder section equal to 0.15):

$$\text{energy consumed} = k(100 \times 9) = k \times 900$$

(the pump flow rate being equal to the total flow rate to be treated and the pump working pressure being equal to 15% of the working pressure of membrane 16).

Equipment of FIG. 2:

$$\text{energy consumed} = k(150 \square 60) = k \square 900$$

(the pump flow rate being equal to the flow rate of the produced fresh water and the pump working pressure being equal to the working pressure of membrane 16).

It is thus clear that, whereas conventional systems have a theoretical efficiency equal to the recovery (e.g. 15%), the system of FIG. 2, as well s the system of FIG. 1, allows an energy recovery, relative to the conventional systems, equal to the mathematical complement to one of the recovery of membrane 16 [energy recovery=6000−900=5100=6000 (1−15%)].

In practice, however, while the equipment in FIG. 1 recovers energy by reducing the working pressure of pump 1, relative to the working pressure of membrane 16, by a factor equal to the recovery, while leaving the flow rate of the water to be treated unchanged, the system in FIG. 2 leaves the pump working pressure unchanged, the latter being equal to the membrane working pressure, but reduces the flow rate of the same pump by a factor equal to the recovery.

Anyhow, both these embodiments provide the same energy advantage.

However, the equipment in FIG. 2 has, compared with the equipment in FIG. 1, the following advantages:

the recovery of the equipment in FIG. 1 is fixed, depending upon the geometric ratio of the shaft/cylinder cross sections, whereas, in the system of FIG. 2, the recovery may be more easily changed, by changing the flow rates of pump 1 and 25;

in the system of FIG. 1, the pressure of pump 1, at its operating point, must be equal to the product of the working pressure of pump 16 and the recovery; this may complicate the provision of commercial pumps able to work exactly at such an operating point.

Figure 3:
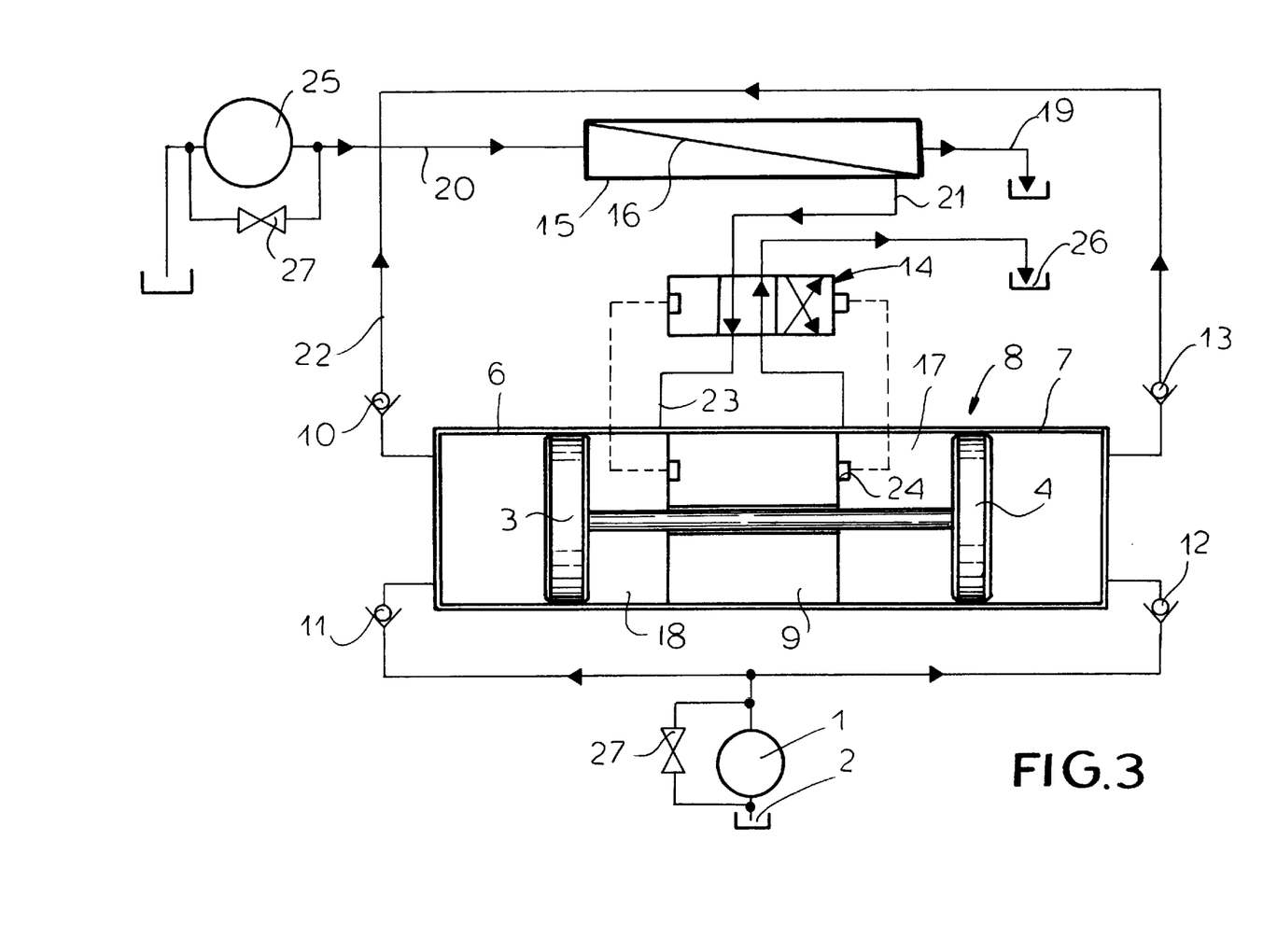
FIGS. 3–5 show variations of the equipment in FIG. 2.
Figure 4:
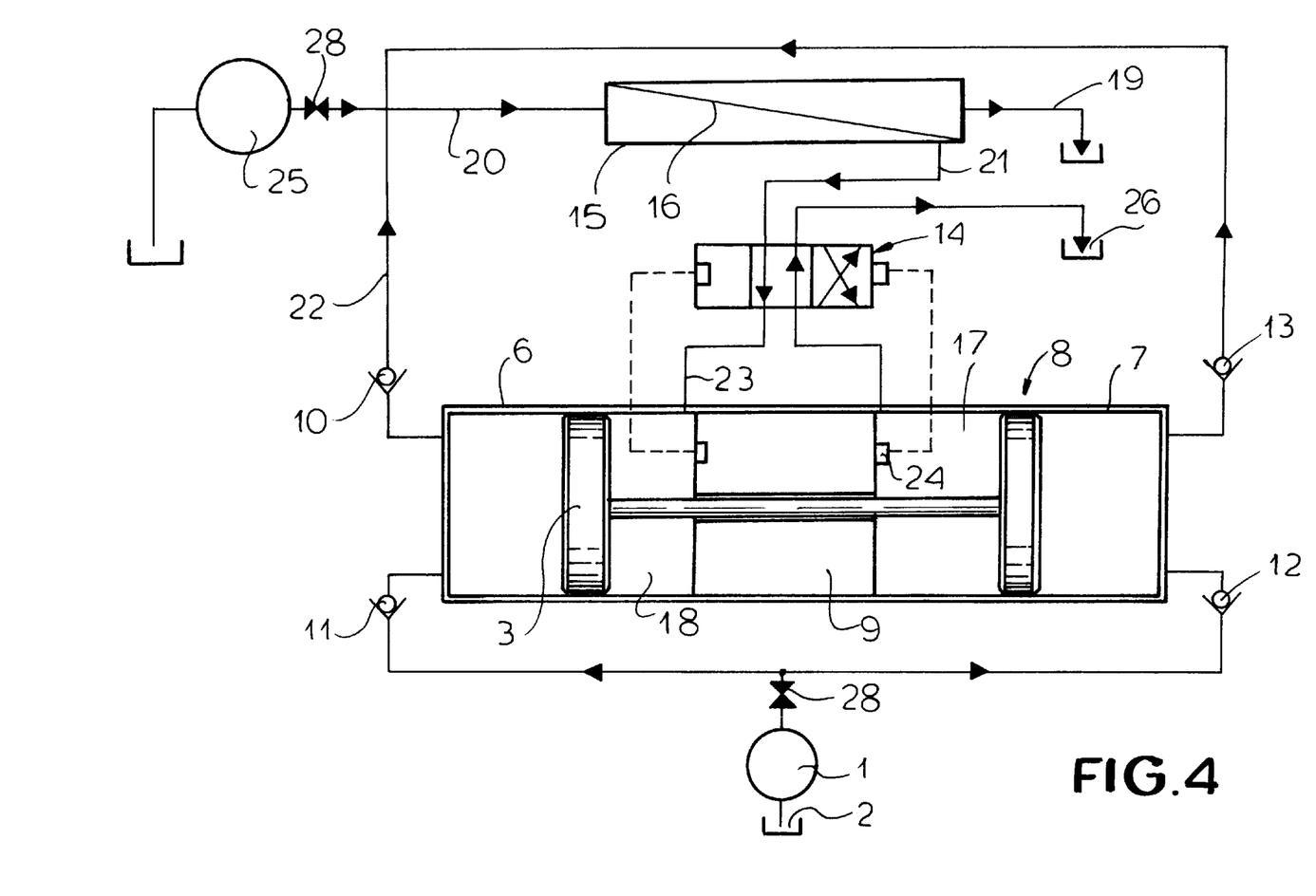
Figure 5:
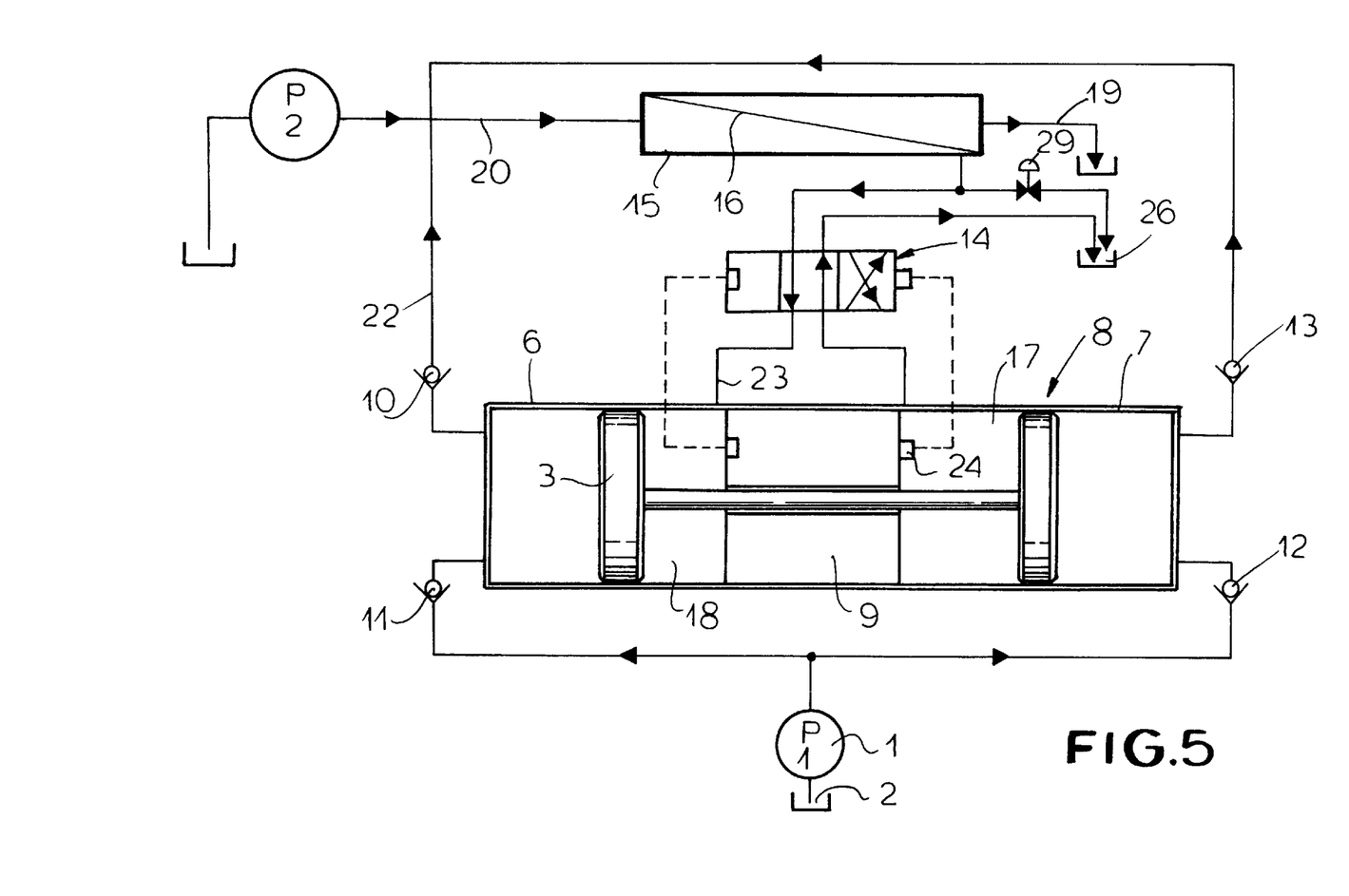

In the equipment of FIG. 2, the recovery may be changed even during the normal working, by one or more of the following arrangements:

by using pumps with a variable curve flow rate vs. head, e.g. by acting upon the speed of the motors controlling the pumps;

by a by-pass 27 on pump 1 and/or pump 25 (FIG. 3);

by a throttle valve 28 on pump 1 and/or pump 25 (FIG. 4);

by an exhaust valve 29 on high pressure line 21 (FIG. 5).

The aforementioned provisions may be used on a stand alone basis or in a suitable combination thereof.

A provision for reducing the pressure peaks due to pump 1 and/or pump 25 during the switching is that of connecting a dampener to the outlet of the same pump (not shown). Such a device is arranged on the delivery line of pump 1 and/or pump 25.

Figure 6:
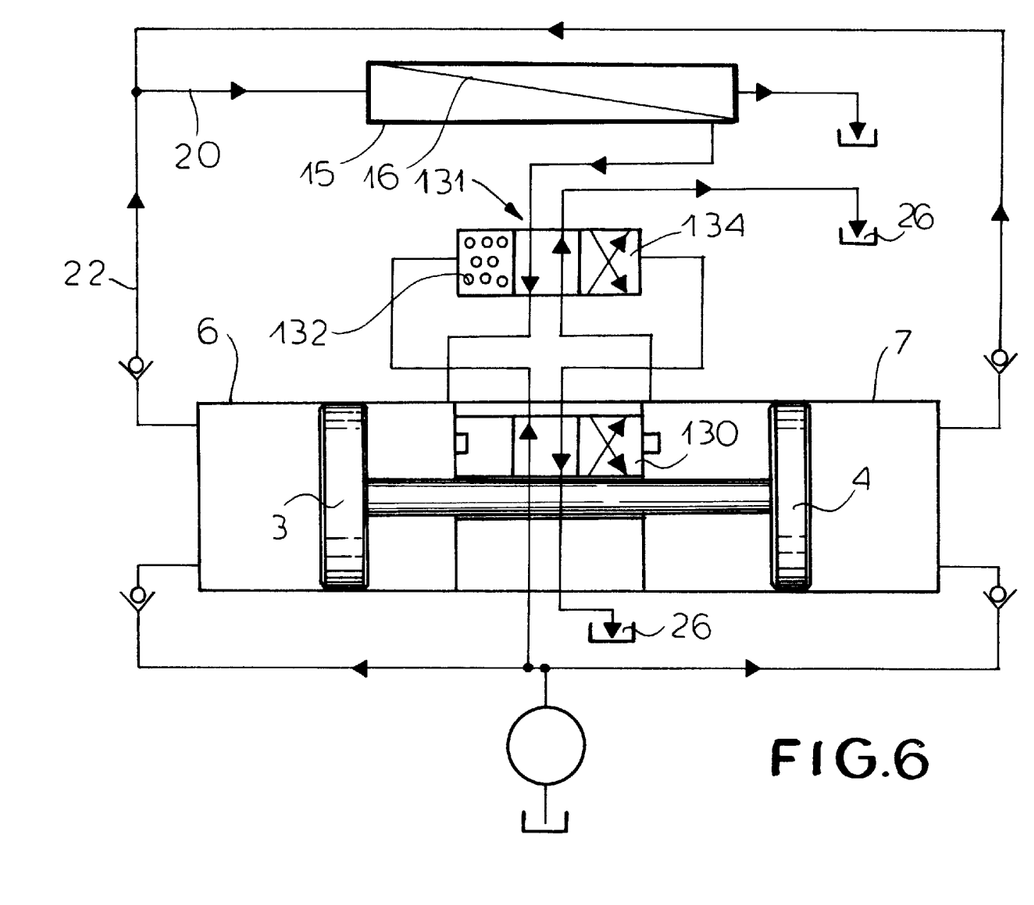
FIG. 6 shows, in an overall schematic view, one of the possible solutions for actuating the cyclical switching of the exchange valves.
Figure 7:
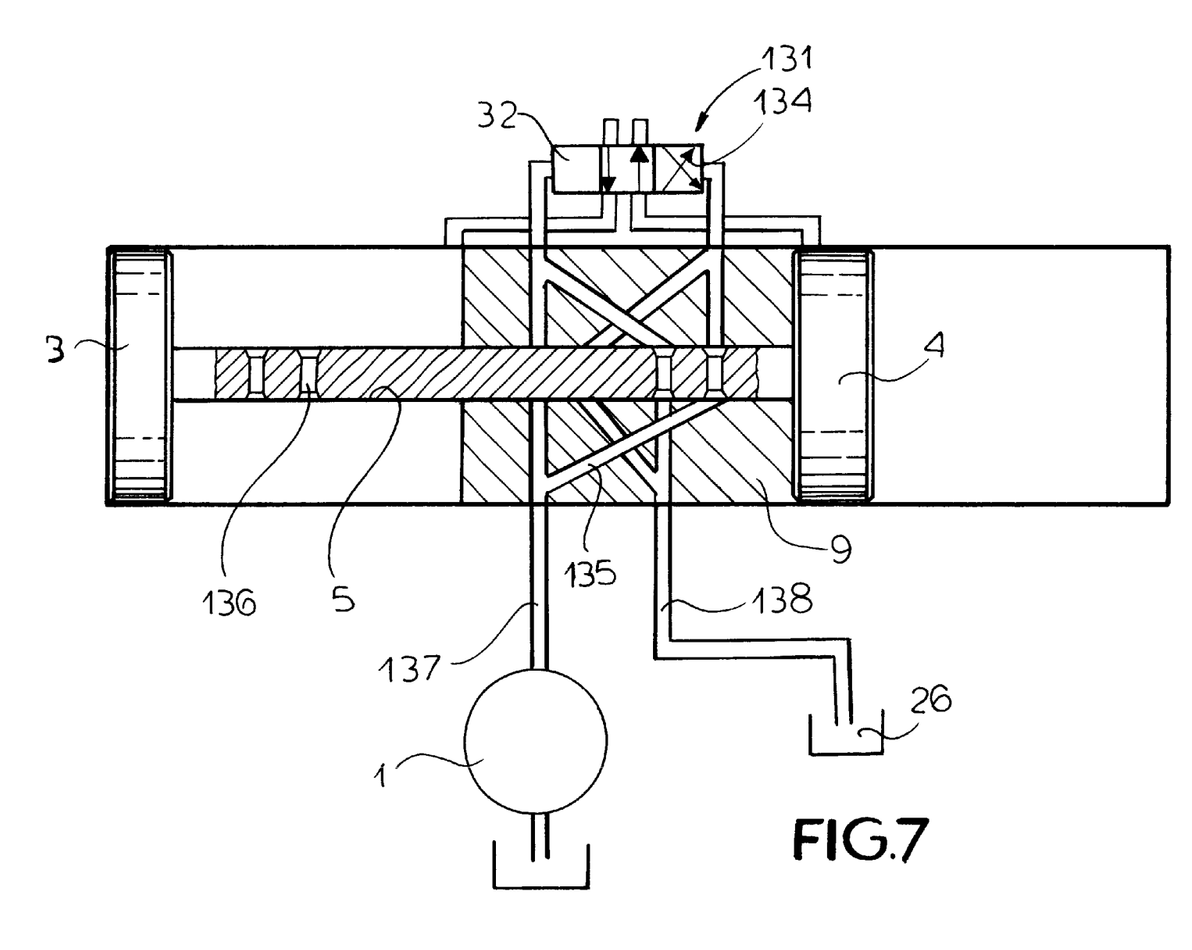
FIGS. 7–8 and 12–13 show two further solutions for actuating the switching of the power valve, adopting, in the first case (FIGS. 7–8) transversal grooves on the shaft, and, in the second case (FIGS. 12–13), longitudinal grooves on the shaft.
Figure 8:
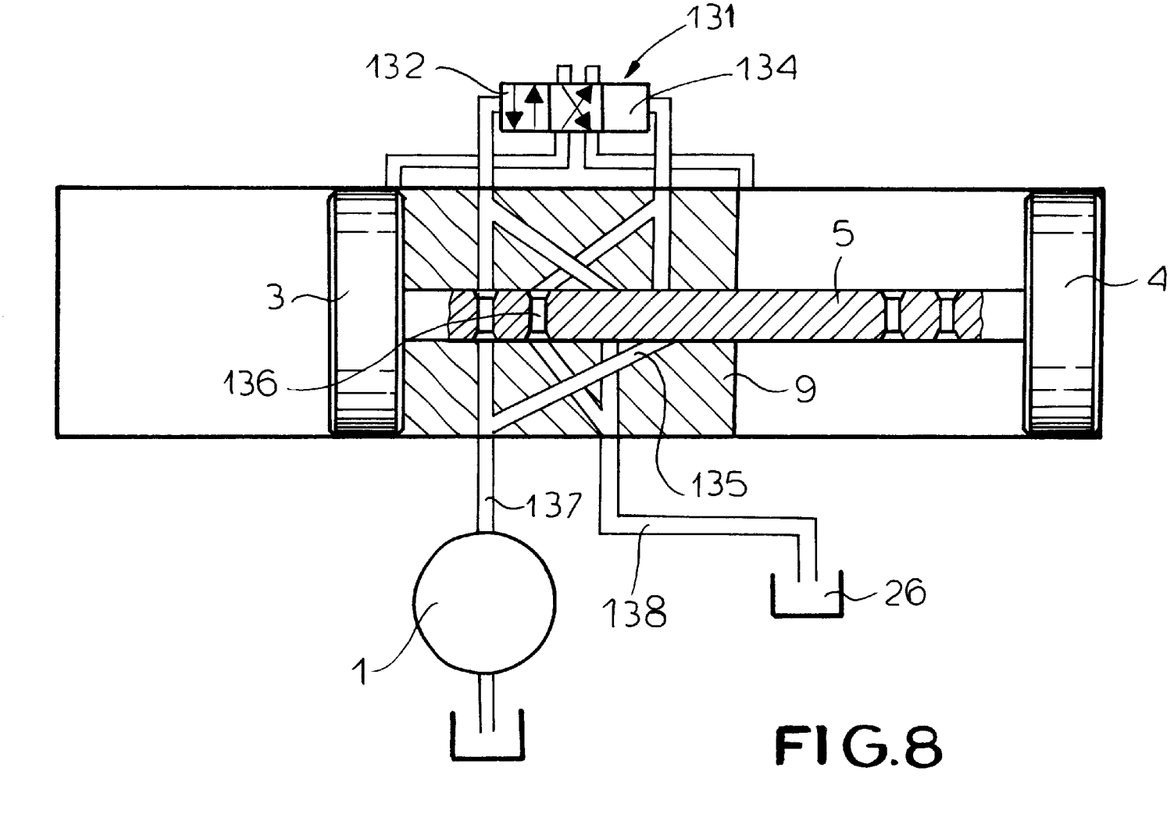

As far as the switching systems of valve 14 are concerned, they may be both for the system of FIG. 1 and the system of FIG. 2, as well as for the related variations, as follows:

a valve 14 comprised of a four-way bistable valve mechanically driven by the beat of the pistons;

a valve 14 comprised of a four-way bistable solenoid valve driven by two microswitches operated by pistons 3, 4; the microswitches may also be proximity switches of an inductive or capacitive type;

a valve 14 comprised of a four-way bistable hydraulic valve, controlled by the pump water or by other pressurized fluids, driven by an external pilot valve, provided, in the illustrated example, with two blocks containing the through-ducts which may be displaced to the right or to the left, i.e. in the two steps of the valve, by suitable introduction and discharge of water into the left and right chambers of the body of said valve. Such a valve is in turn controlled by a bistable pilot valve disposed in separating plate 9 of cylinders 6, 7 and mechanically driven by the base of pistons 3, 4 (FIG. 6). In the position shown in FIG. 6 (pistons 3, 4 moving to the left), pilot valve 130 introduces water, at the pressure provided by feeding pump 1, into the left chamber 132 of power valve 131. This pressure will keep the two blocks containing the through-ducts on the right, thereby connecting cylinder 6 to the membrane outlet and cylinder 7 to exhaust 26. Alternatively, the through-ducts may be formed on the valve body, and the movable blocks, by suitably closing and opening such ducts, have the same function as the exchange valve. As piston 4 reaches the end of its travel, it will push the pilot valve 130 to the left thereby switching it. In the new position, the pilot valve will pump water in right chamber 134 of power valve 131 and connect to exhaust 26 the water contained in left chamber 132 of the same power valve. This will result in the sudden leftward movement of the blocks of power valve 131, and hence the cycled will be reversed (cylinder 6 connected with the exhaust and cylinder 7 connected with the membrane outlet);

a valve 14 comprised of a four-way bistable hydraulic valve controlled by one or two pilot solenoid valves driven by microswitches (possibly of an inductive or capacitive type), in turn controlled by pistons 3, 4;

a valve 14 comprised of a four-way bistable hydraulic valve controlled via a plurality of ducts provided within the central plate 9 and able to cooperate with suitable grooves provided on shaft 5 connecting pistons 3, 4 (FIGS. 7, 8). This solution eliminates the need of using electrical equipment and providing moving members within plate 9 separating the two cylinders. In fact, pilot valve 130 is formed by suitable ducts 135, provided within the plate 9 separating the two cylinders, as well as by suitable grooves 136, provided on the shaft 5.

The operation of the system is as follows.

As the pistons end their leftward travel (see FIG. 7), the grooves 136 on shaft 5 put in fluid communication the duct 137 between the pump and the right chamber 134 of the power valve 131, and connect to the exhaust 26 of FIG. 6, via the duct 138 of FIG. 7, the water contained into the left chamber 132. This will result in the quick switching of valve 131.

As the pistons end their rightward travel (see FIG. 8), the grooves 136 on shaft 5 put in fluid communication the duct 137 between the pump 1 and the left chamber 132 of power valve 131, and connect to the exhaust duct 138 the water contained into the right chamber 134 of the power valve, again resulting in the switching of valve 131.

Figure 9:
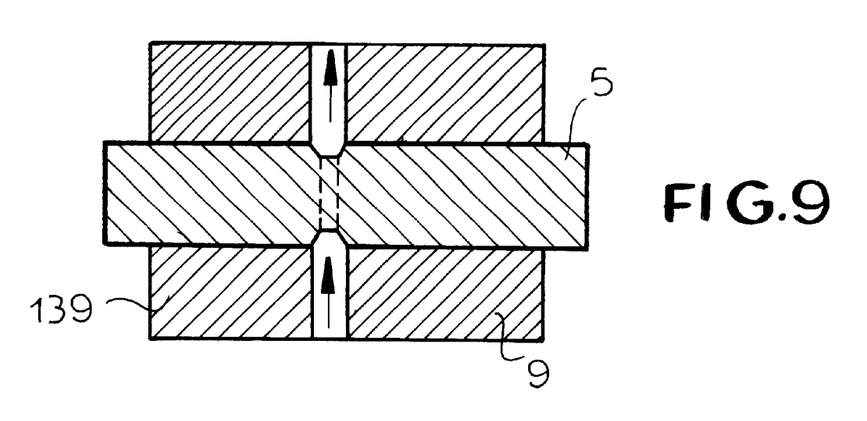
FIGS. 9, 10, 11 show details of the aforementioned grooves.
Figure 10:
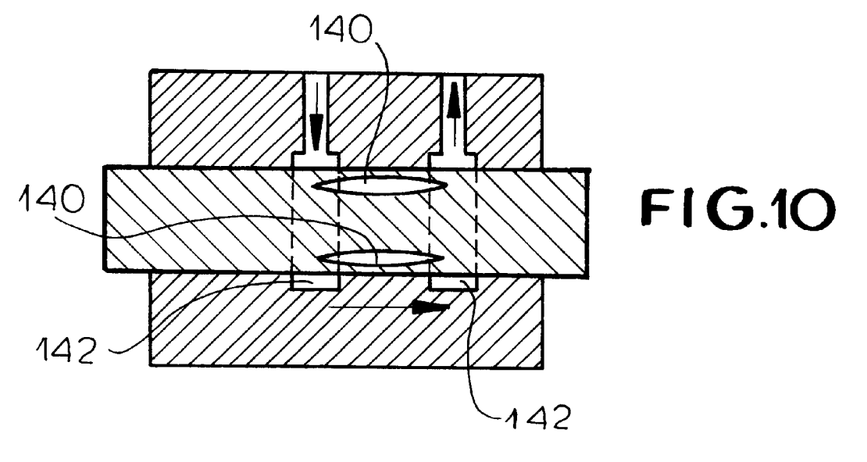

The grooves on shaft 5, allowing the passage of liquid (and the related channeling on the pump body, cooperating with said grooves), may be embodied according to the following solutions:

transversally to the shaft, by a circular groove 139 provided along the entire circumference of the same shaft (FIG. 9);

longitudinally to the shaft, by one or more horizontal grooves 140 provided on the shaft surface (FIG. 10).

In the latter case, in order to avoid loss of communication by rotation of the shaft within its seat between the ducts of the pump body and the shaft grooves, a circular relief 142, at the duct lumen, must be provided on the pump body, so that the liquid coming from the duct meets the horizontal grooves of the shaft, irrespective of the angular position between shaft and pump body.

Figure 11:
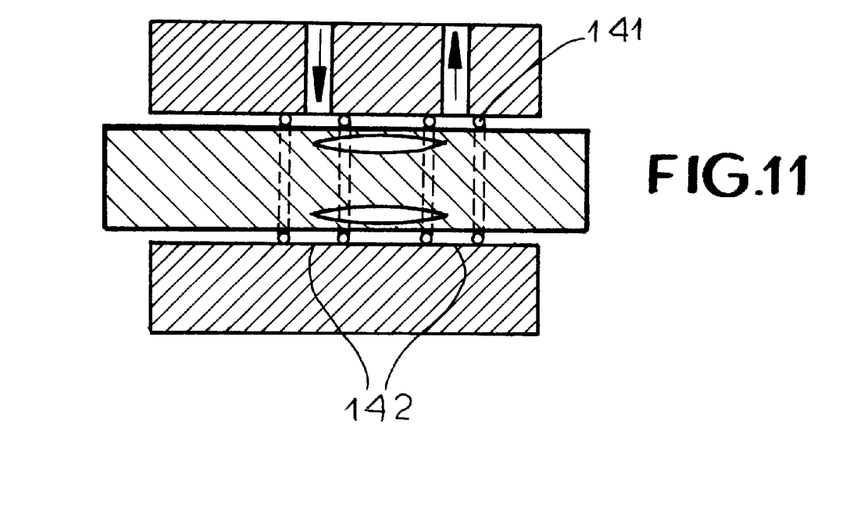

Since normally an O-ring type gasket 141 is arranged upstream and downstream of the lumen of each duct, the aforementioned circular relief 142 in correspondence of the duct may be provided in the space between the O-rings upstream and downstream of the duct, the shaft and the pump body (FIG. 11).

Longitudinal grooves (FIGS. 10–11) and not transverse grooves (FIG. 9) may be preferred on the shaft should the hydraulic gaskets (between the two cylinders and between the several ducts coming to the sliding seat of the shaft) be comprised of soft gaskets. In fact, in this case, the shaft transverse grooves provided in FIG. 9 might, during the sliding motion of the shaft, scratch said gaskets or remove them from their seats.

Figure 12:
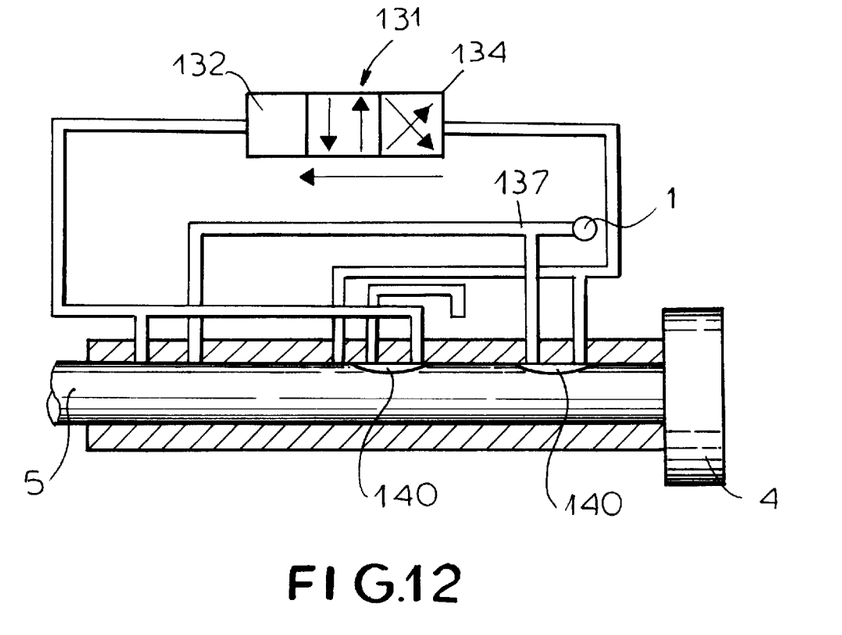
Figure 13:
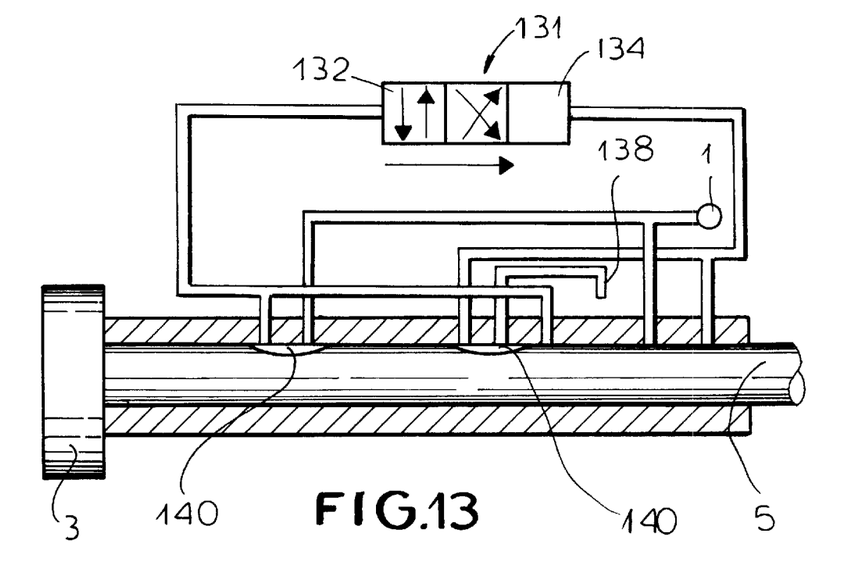

FIGS. 12 and 13 show an example of arrangement of the ducts able to cooperate with the shaft grooves of a longitudinal type.

Anyhow, it is intended that the embodiment of the ducts shown in FIGS. 7–8 (ducts able to cooperate with transverse grooves on the shaft) and in FIGS. 12–13 (ducts able to cooperate with longitudinal grooves on the shaft) be merely indicative, as, according to the specific design and functional requirements, such ducts maybe embodied in the most advantageous number and arrangement.

Since in the system with the high pressure pump, shown in FIGS. 2–5, the low pressure pump has only the function of allowing the piston translation and accordingly the pumping of saline water into container 15, it is possible to achieve the piston translation also through an external mechanical energy source (e.g. an electric motor) able to impart the needed reciprocating motion to the shaft/pistons assembly via suitable kinematic chains.

In this configuration, it is possible either to omit the low pressure pump (in such case the piston moving towards the central plate creates a depression able to draw the fluid to be treated) or, should such a depression not be sufficient, to provide a low pressure pump which, however, will have a very low power, having just to pump the water into the cylinders, since the energy needed for the translating motion of the pistons is provided by the external mechanical energy source.

Furthermore, advantageously, since the motor and the pump body, due to the unavoidable energy losses, generate heat, normally dispersed in the ambient air by convection, and since, as it is known, the efficiency of the reversed osmosis membranes tends to greatly increase upon increasing of the temperature of the fluid to bed desalinated, it is possible, in order to exploit both the aforementioned phenomena and hence to further optimize the whole energetic efficiency of the plant, to use the hereinbelow described arrangement.

The motor and the body of the feeding pump may be provided with a water cooling system, by means of a coil, or generally a chamber, surrounding the pump body and provided with an inlet and an outlet, wherein the water may be circulated.

The water pumped by the same feeding pump is sent entirely or in part to the inlet of the exchanger, an embodiment (not shown) of which has been exemplified above.

The water outflowing from the exchanger, after having removed the excess heat generated by the pump and thereby having increased its own temperature, is as usually sent to the remaining parts to the plant described above.

Such a system therefore allows efficient cooling of the pump, thereby increasing its efficiency, duration of operation and reliability, and, by increasing the temperature of the water to be desalinated, allows a considerable increase of the efficiency of the osmosis process.

More generally, any available heat source may be used to suitably increase the temperature of the fluid to be desalinated and thereby increase the efficiency of the osmosis process.

For example, in nautical applications, it is possible to use the cooling water of the motor or generator to increase the temperature of the water to be desalinated through suitable heat exchangers.

It is also possible to use, as external heat source, a system of solar panels.

What is claimed is:

1. A reverse-osmosis desalination apparatus comprising:
   a cylinder block formed with two cylinders separated from one another by a central plate;
   respective pistons slidably received in said cylinders and interconnected by a shaft extending through said plate;
   an exchange valve having positions controlled by positions of said pistons;
   a reverse-osmosis unit comprised of at least one container provided with at least one reverse-osmosis membrane connected by said exchange valve selectively with said cylinders for delivery of water to be desalinated alternately by said cylinders to said reverse-osmosis unit;
   a low-pressure pump for drawing water to be desalinated and supplying the water to be desalinated to said cylinders; and
   a high-pressure pump operable independently of said low-pressure pump and connected to said reverse-osmosis unit for increasing a pressure in said container.

2. The reverse-osmosis desalination apparatus defined in claim 1 wherein said high-pressure pump has a flow rate corresponding to a flow rate of fresh water produced by said reverse-osmosis unit.

3. The reverse-osmosis desalination apparatus defined in claim 1 wherein said exchange valve is constructed and arranged to displace water from one side of one of said cylinders to an exhaust in one position of said valve and to connect said reverse-osmosis unit to said one side in another position of said exchange valve.

4. The reverse-osmosis desalination apparatus defined in claim 1 wherein said high-pressure pump is connected to said unit in a high-pressure circuit.

5. The reverse-osmosis desalination apparatus defined in claim 4 wherein the cross section of said shaft is small by comparison with the cross section of said cylinders and the volume rate of flow in said high-pressure circuit is substantially constant.

6. The reverse-osmosis desalination apparatus defined in claim 5 wherein a ratio between the flow rates of said high-pressure pump and said low-pressure pump corresponds substantially to the ratio of the fresh water produced by said unit and the total flow rate of water to the membrane of said unit.

7. The reverse-osmosis desalination apparatus defined in claim 5, further comprising a device for damping pressure peaks for both said high-pressure pump and said low-pressure pump upon switching of said valve.

8. The reverse-osmosis desalination apparatus defined in claim 1, further comprising a bypass on at least one of said pumps.

9. The reverse-osmosis desalination apparatus defined in claim 1, further comprising a throttle valve on at least one of said pumps.

10. The reverse-osmosis desalination apparatus defined in claim 1 wherein at least one of said pumps has a variable flow rate versus head characteristic.

11. The reverse-osmosis desalination apparatus defined in claim 1 wherein a high-pressure line connects said unit with said valve and is provided with an exhaust valve.

12. The reverse-osmosis desalination apparatus defined in claim 1 wherein said exchange valve is a solenoid valve controlled by two switches operated by said piston.

13. A reverse-osmosis desalination apparatus comprising:

a cylinder block formed with two cylinders separated from one another by a central plate;

respective pistons slidably received in said cylinders and interconnected by a shaft extending through said plate;

an exchange valve having positions controlled by positions of said pistons;

a reverse-osmosis unit comprised of at least one container provided with at least one reverse-osmosis membrane connected by said exchange valve selectively with said cylinders for delivery of water to be desalinated alternately by said cylinders to said reverse-osmosis unit;

a pump for drawing water to be desalinated and supplying the water to be desalinated to said cylinders; and a pilot valve formed by a plurality of ducts formed in said central plate and grooves formed on said shaft and communicating with said ducts, said ducts being connected to said exchange valve for hydraulically shifting said exchange valve.

14. The reverse-osmosis desalination apparatus defined in claim 13 wherein said grooves are circular grooves extending around the entire circumference of said shaft.

15. The reverse-osmosis desalination apparatus defined in claim 13 wherein said grooves are longitudinal grooves provided in a surface of said shaft.

16. The reverse-osmosis desalination apparatus defined in claim 13 wherein in an end travel position of the pistons said grooves connect said duct between said pump and a chamber of said exchange valve and connect the exchange valve to a water exhaust.

17. The reverse-osmosis desalination apparatus defined in claim 13, further comprising an annular gasket upstream and downstream of each duct.

18. The reverse-osmosis desalination apparatus defined in claim 13 wherein said pump is driven by a motor, further comprising means for cooling the pump and motor.

19. The reverse-osmosis desalination apparatus defined in claim 13, further comprising means for heating the water to be desalinated.

* * * * *